Nov. 3, 1959 S. G. FISHER 2,910,867
DEPTH AND DEPTH RATE MEASURING SYSTEM
Filed Sept. 29, 1955 5 Sheets-Sheet 3

INVENTOR.
SETH G. FISHER
BY
ATTORNEYS

Nov. 3, 1959         S. G. FISHER         2,910,867

DEPTH AND DEPTH RATE MEASURING SYSTEM

Filed Sept. 29, 1955         5 Sheets-Sheet 4

INVENTOR.
SETH G. FISHER
BY
ATTORNEYS

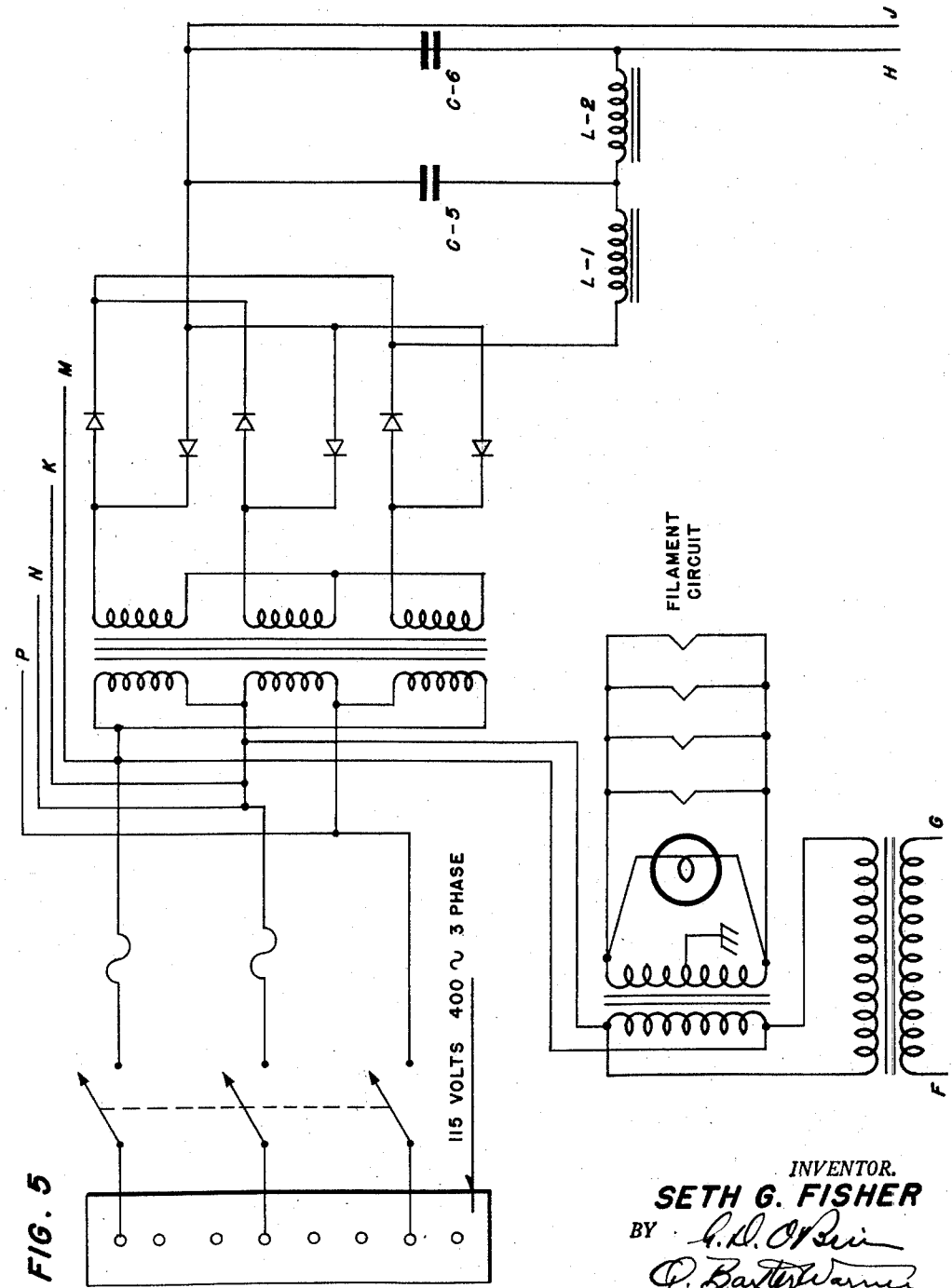

United States Patent Office 2,910,867
Patented Nov. 3, 1959

2,910,867

DEPTH AND DEPTH RATE MEASURING SYSTEM

Seth G. Fisher, Sharon, Pa., assignor, by mesne assignments, to the United States of America as represented by the Secretary of the Navy Application September 29, 1955, Serial No. 537,605

2 Claims. (Cl. 73—179)

This invention relates to a measurement of the depth position of a body or a submarine when submerged in a fluid or the sea and the rate of change of the measured depth position when the body is moved to other depths. This application is related to my copending application Serial No. 537,606, filed September 29, 1955.

Accordingly, an object of the present invention is to indicate accurately the depth position and the rate of change of the depth position of a submerged body in a fluid over a wide range of depth.

Another object is to provide an apparatus capable of high gain and stability with a very quick corrective response to any change in depth in the position of the body.

A further object of the invention is the provision of a system capable of a high degree of accuracy or resolution having excellent repeatability in the measurement of depth position.

Another object is to provide direct numerical indication of a depth.

Still another object of the present invention is to provide indication of a wide range of depth rate measurement.

Other objects and many of the attendant advantages of this invention will be readily appreciated as the same becomes better understood by reference to the following detailed description when considered in connection with the accompanying drawings wherein:

Figs. 2 through 5 show a schematic diagram of a preferred embodiment of the apparatus of the invention, wherein Fig. 2 is a schematic diagram of the sensing element and balance network;

Fig. 3 is a schematic diagram of the four-stage electronic amplifier;

Fig. 4 is a schematic diagram of the magnetic amplifier, motor, generator, gear train, spiral potentiometer and depth indicator and depth rate indicator; and Fig. 5 is a schematic diagram of the power supply and transformer.

Figure 2:
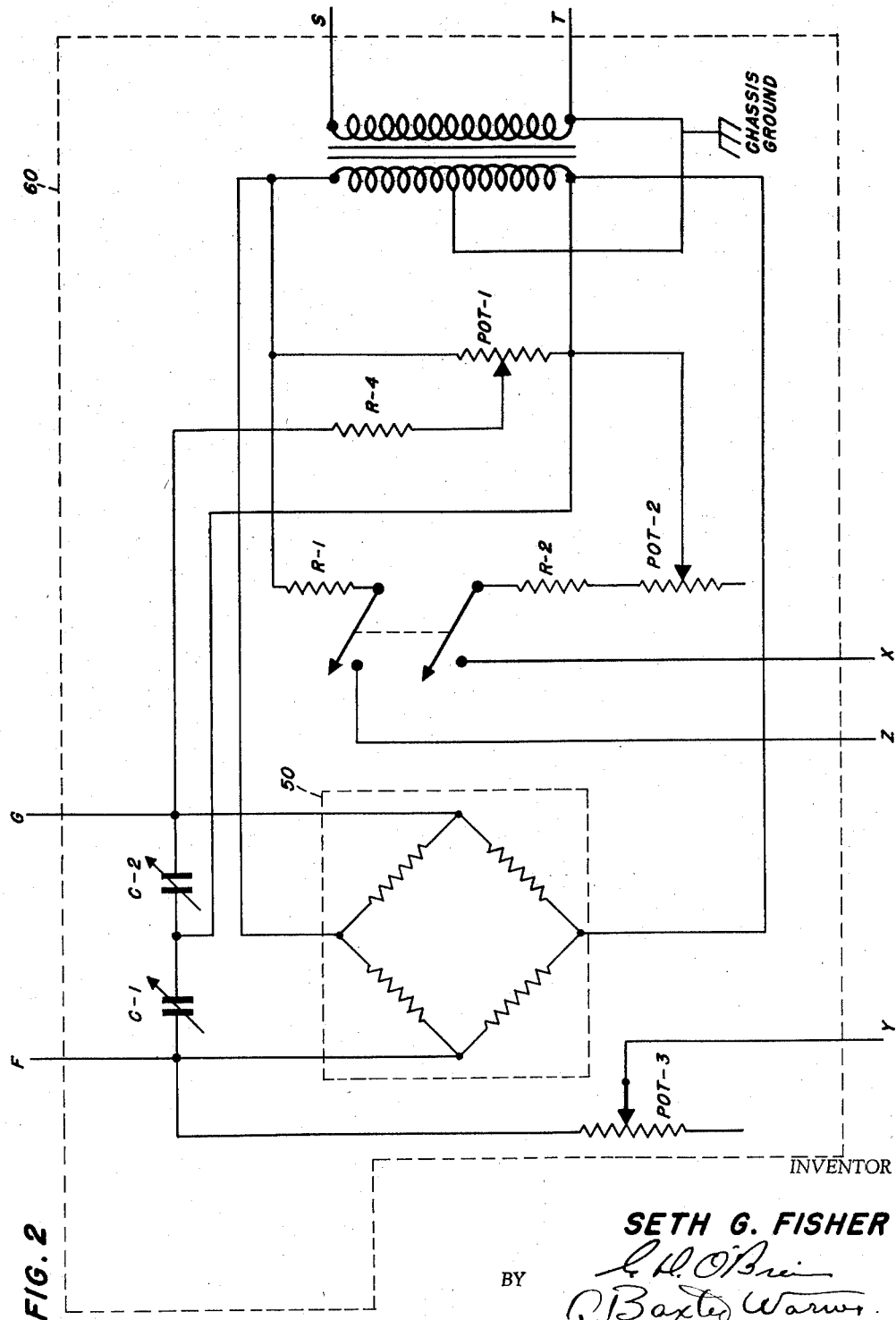
Figure 3:
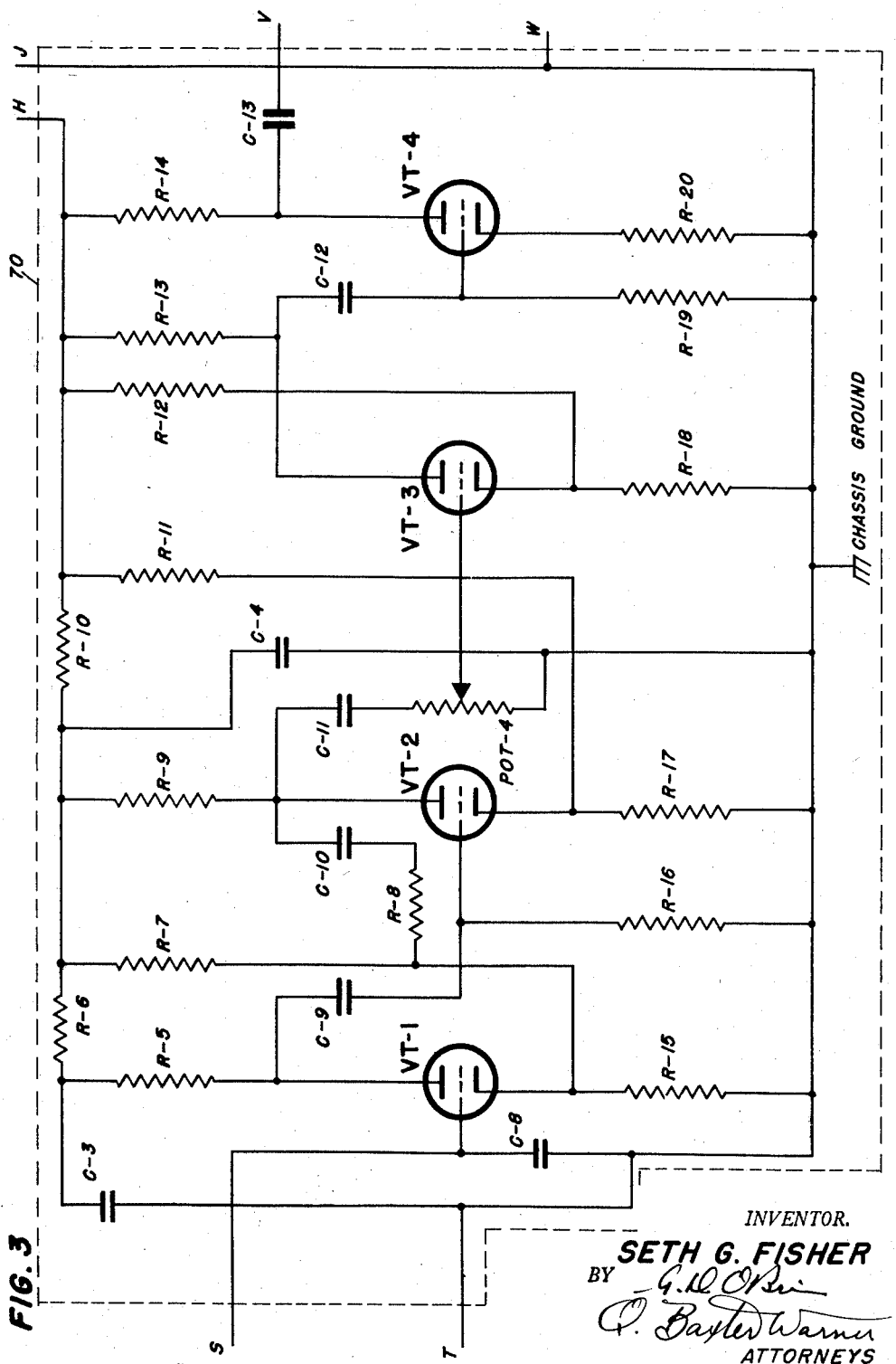

Referring now to the drawings, wherein like reference characters designate like or corresponding parts, there is shown schematically in Fig. 2 a sensing element and balance network. To solve the problem of measuring the pounds per square inch of static pressure of a fluid at any particular depth and converting this measurement to an indication in feet at that particular depth, a pressure measuring device employing the strain gage principle connected as a Wheatstone bridge as a sensing element is used. For measuring the static pressure from 0 to 1000 feet of depth, a 0 to 500 p.s.i.g. SR-4 Baldwin Fluid Pressure Cell 50 may be used. The voltage output of the cell is caused by the change in pressure of the fluid which varies the resistance of the cell which unbalances the Wheatstone bridge of the sensing element. The output of the Wheatstone bridge is passed through a balance network 60. This network 60 is designed for balancing the zero pressure condition of the cell both for resistance and reactance at a minimum voltage output by potentiometer, pot. 1, and variable capacitors C–1 and C–2. In addition, the network is capable of adjusting the output of the pressure cell for a minimum (zero) pressure point by pot. 2 and for a maximum (1000 foot) pressure point by pot. 3. The potentiometers pot. 2 and pot. 3 are considered to be calibrating potentiometers. The controlling or spiral potentiometer 140 (Fig. 4) is connected within the balance network 60 and is a ten turn precision potentiometer with negligible capacitances. The function of the spiral potentiometer 140 is to balance the output of the pressure cell at any given pressure for a minimum voltage whose position or value becomes proportional to the depth of the body in the fluid.

The external source of 115 volts, 400 cycles, three-phase voltage is applied to the transformer 30, power supply 40, motor 90, generator 100, and rate indicator 105. The transformer 30 supplies filament voltage for the electronic amplifier 70 and 8 volts R.M.S., 400 cycle voltage to the pressure cell 50. The pressure of the fluid in which the body carrying the present apparatus is submerged, causes the resistance of the pressure cell 50 to change which gives a particular output or voltage per foot of depth. The output of the cell 50 is 7.12 microvolts per foot of depth. In salt water each additional foot of depth increases the static pressure 0.4465 p.s.i.

At a particular depth if the pressure cell 50 is measuring a different depth pressure than is indicated by the ten turn or spiral potentiometer 140, there exists a voltage across the output of the network greater than the balanced minimum voltage for that particular depth. This increased or error voltage is amplified by the electronic amplifier 70, and the magnetic amplifier 80. The speed and direction in rotation of a servo motor 90 is controlled by the output of the magnetic amplifier 80. Servo motor 90 may be of the type known to the Navy as Mk. 12, Md. 0. The motor is mechanically coupled through a gear train 110 and antibacklash gear train 130 to drive the ten turn potentiometer 140 connected within the balance network so as to decrease this error voltage by making the potentiometer indicate the correct value for the particular depth. When the error voltage decreases to a minimum value, servo motor 90 stops and the ten turn potentiometer 140 has been driven to a new position proportional to the static pressure applied to the pressure cell.

By means of adjusting potentiometers, pot. 2 and pot. 3, in the balance network, the spiral ten turn potentiometer 140 is adjusted to have a range of a hundred feet of depth error per revolution. By gearing the ten turn potentiometer rotation upwards to the ratio of ten to one and adding a digit counter 120 capable of indicating tenths of a revolution, a numerical indication of depth in one foot increments is obtained and the counter will thus read directly in feet of depth. With the addition of ten subdivisions between successive numbers, the counter will then indicate tenths of foot of depth.

Since the above apparatus for measuring the depth of a position of a body in a fluid, has a fast responding highly stabilized servo system, the transient response to the error voltage has a short time constant and is well damped. This means that as the static depth pressure changes the system will follow the depth measurement at rates up to the maximum speed of the servo motor with very low error between the indicated depth and the actual depth pressure. As a consequence, the speed of the servo motor is proportional to the rate of change of depth position. There is mounted a 400 cycle generator 100 as an integral part of the servo motor 90. The output of this generator is proportional to the speed of the motor, therefore, the voltage of this generator becomes a measure of rate of change of depth position. The polarity of the generated voltage indicates the direction of the rate of change of depth position.

Since A.C. voltmeters are not polarity sensitive, a voltage of the proper magnitude and phase is added in series with the generator output and this combined voltage is then metered to indicate the rate of change of depth position. The alternating current voltmeter will then be used as a depth rate indicator 105. The meter will indicate zero rate of change of depth position at mid-scale and will indicate an increase for rates of change of depth position producing generated voltages in phase with the fixed voltage and will indicate a decrease for rates of change of depth position producing generated voltages 180 degrees out of phase with the fixed voltage of 115 volts, 400 cycles.

Figure 1:
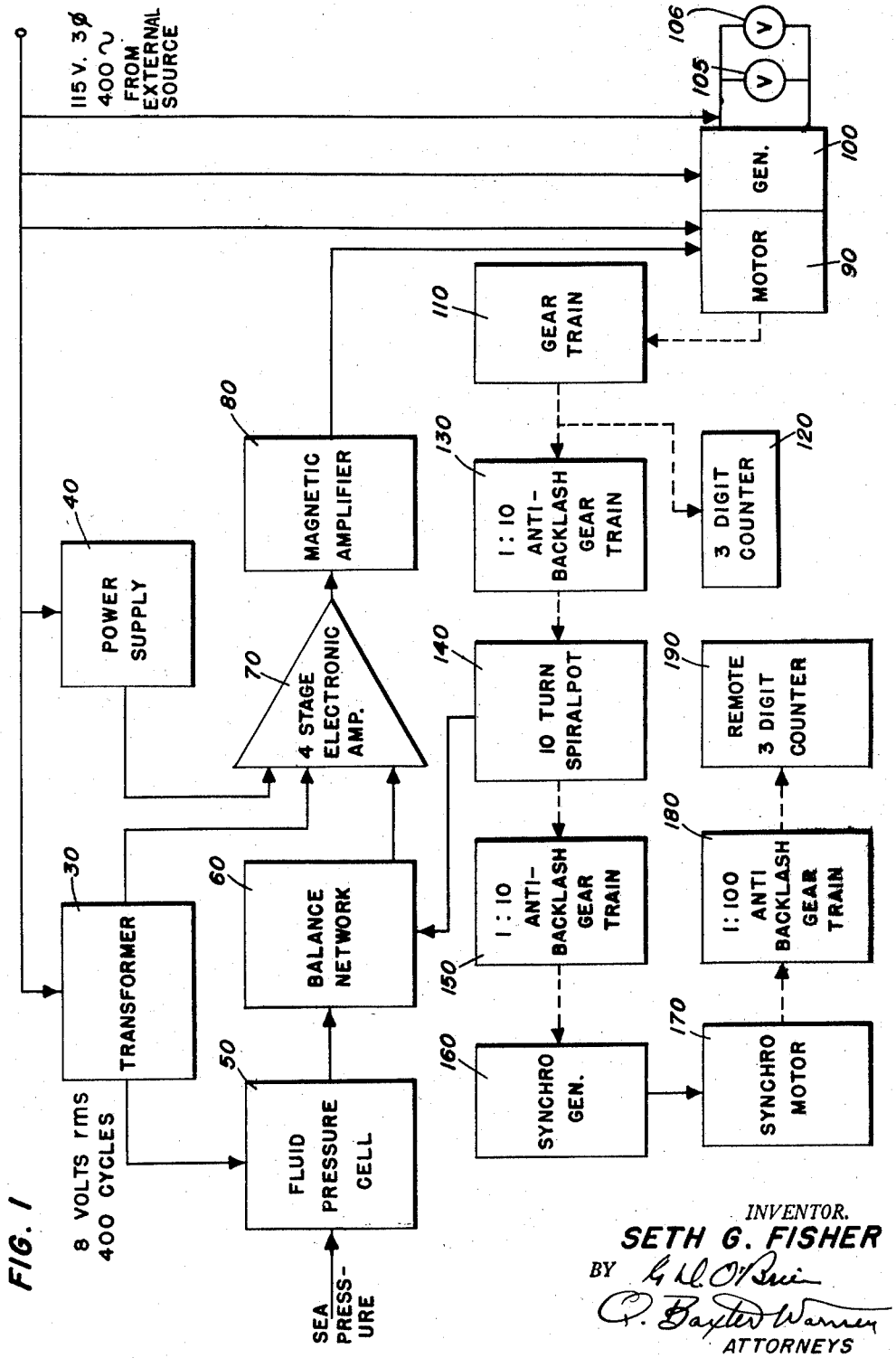
Fig. 1 shows a block diagram of the apparatus of the invention.
Figure 4:
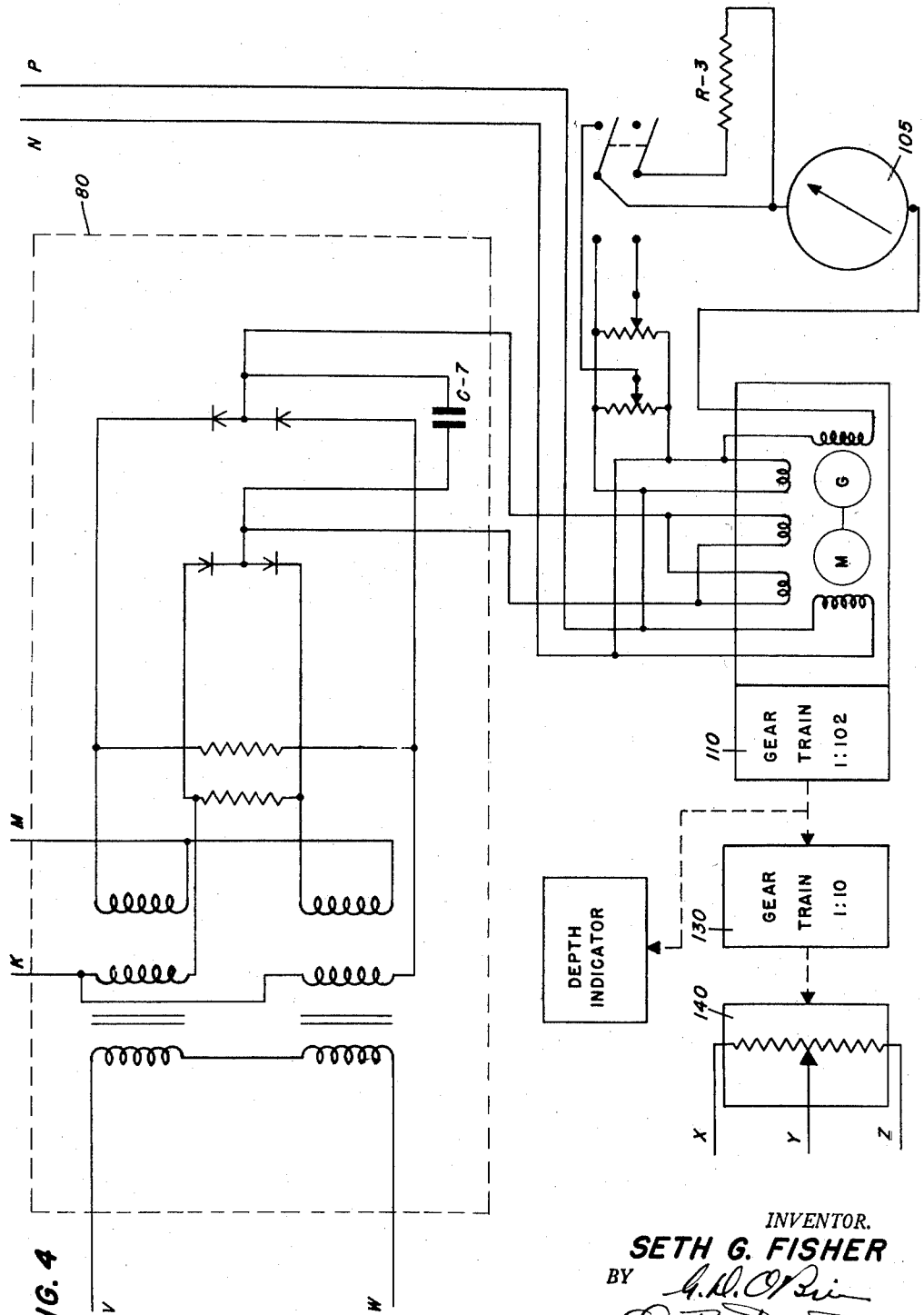

An indication of dual range on the voltmeter or rate indicator 105 is obtained by using the meter 105 with two different voltage ranges and two fixed voltages of different magnitudes as shown by pot. 5 and pot. 6 in Fig. 4. Thus, the rate indicator can be adjusted to indicate depth rates from 0 to 6.5 feet per second climb or dive and from 0 to 2.5 feet per second climb or dive with a linearity and accuracy of ±5% of full scale. The maximum value of depth rate can be either increased or decreased by changing the gear ratio between the servo motor and the counter for the depth indication. Remote indication can be accomplished by adding more voltmeters 106 in parallel in a similar manner as shown in Fig. 1.

The measuring system may be a completely contained unit housed in a volume of approximately 14 inches by 12 inches by 7 inches and weighing approximately 20 pounds. All voltages may be obtained within the unit except for 115 volt, three-phase, 400 cycle power. Since the unit weighs little and uses a strain gage type instead of a Bourdon type sensing element, it is capable of withstanding shock. This measuring system can be adjusted to indicate depth from 0 feet to 1000 feet with a linearity of ±0.5% of full scale and with a resolution of one half foot.

The range could be increased or decreased by selecting a pressure cell with a different range. The linearity could be improved by using a hand calibrated scale to show the position of the ten turn potentiometer 140 instead of the counter. The resolution could be improved by stringing the resistance of the ten turn potentiometer over 15 or 20 turns. The system could be made to operate on 60 cycles either single-phase or three-phase. Remote depth indication can be added by adding "slave" counters to the present depth counter. The preferred way of adding remote indication as illustrated by Fig. 1 would be to gear down the ten turn potentiometer rotation by ratio of 10 to 1 to a synchro generator 160 by an antibacklash gear train 150. This synchro generator could then drive synchro motors 170 that in turn would be geared upward 100 to 1 by an antibacklash gear train 180 and connected to digit counter 190 to show the measured depth.

In one embodiment of the apparatus of the invention shown merely by way of example and in nowise to be considered as limiting the scope of the invention, the following values of the various elements were found to be appropriate:

Resistors

| | Ohms | | Ohms |
|---|---|---|---|
| R-1 | 10K | R-12 | 100K |
| R-2 | 9K | R-13 | 33K |
| R-4 | 200K | R-14 | 12K |
| R-5 | 33K | R-15 | 390 |
| R-6 | 18K | R-16 | 510K |
| R-7 | 100K | R-17 | 220 |
| R-8 | 120K | R-18 | 220 |
| R-9 | 33K | R-19 | 510K |
| R-10 | 10K | R-20 | 560 |
| R-11 | 100K | | |

Tubes

| | |
|---|---|
| VT1, 2, 3 | 5744 |
| VT4 | 5703 |

Chokes

| | Ohms |
|---|---|
| L-1 | 3H225 |
| L-2 | 3H225 |

Potentiometers

| | |
|---|---|
| Pot. 1 | 25K ohms initial balance. |
| Pot. 2 | 500 ohms zero foot balance. |
| Pot. 3 | 2.5K ohms 1000 foot balance. |
| Pot. 4 | 500K ohms depth gain. |
| Pot. 5 | 10K ohms low rate calibration. |
| Pot. 6 | 10K ohms high rate calibration. |
| Spiral Pot. (140) | 1K ohms. |

Condensers

| | |
|---|---|
| C-1 | 500 mmfd. |
| C-2 | 500 mmfd. |
| C-3 | 2 mfd. |
| C-4 | 2 mfd. |
| C-5 | 40 mfd. 450 WVDC. |
| C-6 | 40 mfd. 450 WVDC. |
| C-7 | 1 mfd. |
| C-9 | .01 mfd. |
| C-10 | .1 mfd. |
| C-11 | .01 mfd. |
| C-12 | .01 mfd. |
| C-13 | .5 mfd. |

It is therefore apparent in the light of the foregoing description that the invention presents a quick, stable and accurate solution for measuring a depth position and a rate of change of depth position.

Obviously many modifications and variations of the present invention are possible in the light of the above teachings. It is therefore to be understood that within the scope of the appended claims the invention may be practiced otherwise than as specifically described.

What is claimed is:

1. An underwater depth and depth-change-rate measuring system comprising, in combination: a pressure-responsive cell of strain-gage Wheatstone bridge type adapted to be unbalanced in accordance with the underwater depths and correspondingly with the pressures to which said cell is subjected; means for energizing said strain-gage bridge from a voltage source, said bridge then normally providing a voltage-difference output corresponding to the bridge unbalance; said strain-gage bridge having a first pair of diagonally opposite junctions to which energizing voltage from said source is applied, and a second pair of diagonally opposite junctions at which said voltage-difference output appears; potentiometer means having a resistor element in circuit between said second pair of junctions, and having a contact arm positionable to connect an intermediate point of said resistor element to one of said first pair of junctions, to effect a rebalanced condition of the resultant bridge circuit at any measurement depth; servo means including a servo motor responsive to said voltage-difference output to drive and displace said potentiometer arm to a resultant bridge balancing position at which the voltage-difference output becomes substantially zero; first means responsive to the displacement experienced by said potentiometer arm to provide an indication of underwater depth; and second means responsive to the displacement-rate experienced by said potentiometer arm to provide an indication of the depth-change-rate to which said pressure cell is subjected.

2. An underwater depth and depth-change-rate measuring system comprising, in combination: a pressure-responsive cell of strain-gage Wheatstone bridge type adapted to be unbalanced in accordance with the underwater depths and correspondingly with the pressures to which said cell is subjected; means for energizing said strain-gage bridge from a voltage source, said bridge then normally providing a voltage-difference output corresponding to the bridge unbalance; said strain-gage bridge having a first pair of diagonally opposite junctions to which energizing voltage from said source is applied, and a second pair of diagonally opposite junctions at which said voltage-difference output appears; circuit means connected to said strain-gage bridge and modifying the balance condition thereof to yield resultant bridge balance at a preselected underwater depth and correspondingly tending to produce voltage-difference outputs at depths deviating from said preselected depth, said circuit means comprising series resistors connected between said second pair of junctions and having an intermediate point thereof connected to one of said first pair of junctions; potentiometer means having a resistor element in circuit between said second pair of junctions, and having a contact arm positionable, in accordance with measurement depth relative to said preselected depth, to connect an intermediate point of said resistor element to one of said first pair of junctions, to effect a rebalanced condition of the resultant bridge circuit at said measurement depth; servo means including a servo motor responsive to said voltage-difference output to drive and displace said potentiometer arm to a balancing position at which the voltage-difference output of the resultant bridge circuit becomes substantially zero; first means responsive to the displacement experienced by said potentiometer arm, relative to the bridge balancing position corresponding to said preselected depth, to provide an indication of underwater depth referenced to said preselected depth; and second means responsive to the displacement-rate experienced by said potentiometer arm to provide an indication of the depth-change-rate to which said pressure cell is subjected.

References Cited in the file of this patent

UNITED STATES PATENTS

| | | |
|---|---|---|
| 2,445,335 | Philbrick | July 20, 1948 |
| 2,530,022 | Mershon | Nov. 14, 1950 |
| 2,689,932 | Hornfeck | Sept. 21, 1954 |
| 2,704,936 | Vine | Mar. 29, 1955 |
| 2,718,783 | Anastasia | Sept. 27, 1955 |